United States Patent
Li et al.

(10) Patent No.: US 9,866,079 B2
(45) Date of Patent: Jan. 9, 2018

(54) ELECTRIC MOTOR

(71) Applicant: Johnson Electric S.A., Murten (CH)

(72) Inventors: Yong Bin Li, Hong Kong (CN); Long Shun Jiang, Shenzhen (CN); Xian Chun Fan, Shenzhen (CN); Ping Wang, Shenzhen (CN)

(73) Assignee: Johnson Electric S.A., Murten (CH)

( * ) Notice: Subject to any disclaimer, the term of this patent is extended or adjusted under 35 U.S.C. 154(b) by 254 days.

(21) Appl. No.: 14/981,655

(22) Filed: Dec. 28, 2015

(65) Prior Publication Data
US 2016/0190877 A1    Jun. 30, 2016

(30) Foreign Application Priority Data

Dec. 26, 2014    (CN) .......................... 2014 1 0837269

(51) Int. Cl.
*H02K 1/18*    (2006.01)
(52) U.S. Cl.
CPC .................................. *H02K 1/185* (2013.01)
(58) Field of Classification Search
CPC .. H02K 1/00; H02K 1/14; H02K 1/18; H02K 1/185; H02K 15/028
USPC .... 310/216.055, 216.004, 216.015, 216.052, 310/216.049, 216.113; 29/598
See application file for complete search history.

(56) References Cited

U.S. PATENT DOCUMENTS

| | | | | |
|---|---|---|---|---|
| 2,774,001 A | * | 12/1956 | Riedel | H02K 1/16 29/609 |
| 2,774,897 A | * | 12/1956 | Matthews | B23K 11/14 29/596 |
| 5,218,252 A | * | 6/1993 | Iseman | H02K 1/185 310/216.049 |
| 5,799,387 A | * | 9/1998 | Neuenschwander | B21D 28/02 29/598 |
| 6,020,667 A | * | 2/2000 | Carey | H02K 1/185 29/596 |
| 8,035,271 B2 | * | 10/2011 | Sano | H02K 1/185 310/216.049 |
| 8,916,254 B2 | * | 12/2014 | Nagai | H02K 1/16 310/216.004 |

FOREIGN PATENT DOCUMENTS

FR    1085443    *    2/1955    ............ H02K 1/185

* cited by examiner

*Primary Examiner* — Burton Mullins
(74) *Attorney, Agent, or Firm* — Muncy, Geissler, Olds & Lowe, P.C.

(57) ABSTRACT

An electric motor includes a rotor and a wound stator structure. The stator structure includes a housing, a laminated stator core and windings wound around the stator core. The laminations of the stator core have an annular body and a plurality of teeth extending radially inwardly from the annular body. Projections and recesses are formed at the outer edge of the annular body. When assembled, the recesses of one lamination are aligned with the projections of an adjacent lamination such that when fitting the stator into the housing the projections may be deformed into an axially adjacent recess by contact with the housing. Thus the stator core contacts the housing at discrete locations.

13 Claims, 6 Drawing Sheets

ELECTRIC MOTOR

CROSS REFERENCE TO RELATED APPLICATIONS

This non-provisional patent application claims priority under 35 U.S.C. §119(a) from Patent Application No. 201410837269.5 filed in The People's Republic of China on Dec. 26, 2014, the entire contents of which are hereby incorporated by reference.

FIELD OF THE INVENTION

This invention relates to an electric motor and in particular, to the structure of a wound stator for an inner rotor motor.

BACKGROUND OF THE INVENTION

An electric motor has a movable part referred to as a rotor and a stationary part referred to as a stator. The rotor is connected to a load which is to be moved by the motor. Generally the rotor is arranged to rotate relative to the stator. The rotor and the stator generate an electromagnetic interaction to move the rotor and thus drive the load. According to a position relation between the rotor and the stator, motors are also classified into an inner rotor type and an outer rotor type. As the name implies, in an inner rotor type motor, the rotor is disposed inside the stator. That is, the stator is disposed about the outside of a core of the rotor.

In a known brushless DC motor having a permanent magnet rotor of the inner rotor type, the stator has stator windings wound about a stator core which is fitted to a cylindrical outer housing. To provide a strong connection between the housing and the stator core, the core may be fixed to the housing using glue or an interference fit. However, glue may deteriorate over time. To ensure a strong interference fit, the housing may be heated to cause thermal expansion and then the core is pressed into the housing. This produces a strong connection but it is not production friendly and, as the size of the stator core and the housing is hard to precisely control, the inner surface of the housing may be scratched and scrapings may be left inside the housing, which may affect operation of the motor.

SUMMARY OF THE INVENTION

Hence there is a desire for an electric motor of the type with an inner rotor and a wound stator with an improved structure which reduces the possibility of scrapings being formed between the stator core and the housing.

Accordingly, in one aspect thereof, the present invention provides an electric motor comprising a rotor and a wound stator structure disposed about the rotor, the stator structure comprising: a housing having a cylindrical inner wall; a stator core mounted in the housing, and stator windings wound around the stator core, wherein the stator core comprises an annular yoke extending circumferentially and tooth parts extending inwardly from the yoke, the stator core is formed by stacking a plurality of laminations, and each lamination comprises an annular body that forms the yoke and a plurality of teeth that form the tooth parts, projections and recesses are formed on an outer edge of the annular body of the laminations to form a knurling on a radially outer surface of the yoke, the projections are in contact with the inner wall of the housing, and the projections and the recesses are interposed in an axial direction of the stator core, allowing the projections to be axially deformed, so that the yoke contacts the inner wall of the housing at discrete locations.

Preferably, a plurality of said projections and recesses are formed at an outer edge of the body of each lamination.

Preferably, the projections and recesses of each lamination are alternately distributed in a circumferential direction.

Preferably, the projections of one of two adjacent laminations are aligned with the recesses of the other one of the two adjacent laminations.

Alternatively, the laminations comprise a plurality of first laminations and a plurality of second laminations, a plurality of said recesses are formed in an outer edge of the annular body of each first lamination, a plurality of said projections are formed at the outer edge of the annular body of each second lamination, the first laminations and the second laminations are interposed.

Preferably, the laminations are alternately stacked, wherein at least one second lamination is disposed between two adjacent first laminations, the recesses of the first laminations being axially aligned with the projections of the second lamination.

Preferably, one first lamination is disposed between each pair of adjacent second laminations and one second lamination is disposed between each pair of adjacent first laminations.

Alternatively, a plurality of the second laminations are disposed between at least one pair of adjacent first laminations.

Preferably, a core insulator is fitted to the stator core and the windings are wound around the core insulator and the core insulator electrically isolates the windings from the stator core.

Preferably, terminals are supported by a terminal holder, one end of each terminal is connected with a corresponding one of the windings, and the other end of each terminal is configured for connection to an external power supply.

Preferably, the projections and recesses correspond to positions of the teeth in a radial direction of the motor.

Preferably, the rotor comprises a shaft and a permanent magnet fixed to the shaft.

Preferably, the permanent magnet comprises a plurality of permanent magnets fixed to the shaft by a magnetically permeable rotor core.

In comparison with the conventional stator structure, projections and recesses are formed on the outer periphery of the yoke part of the stator core. The projections and recesses are alternately arranged in the axial direction of the stator core. In assembly of the stator core into the housing body, the projections deform into the recesses, thereby avoiding scratching the housing body. The high-temperature heating step as used in the assembly of the conventional stator is not needed, and using glue to fix the stator core to the housing is also avoided. As such, the manufacturing process can be shortened, and quick assembly of the motor can thus be achieved.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
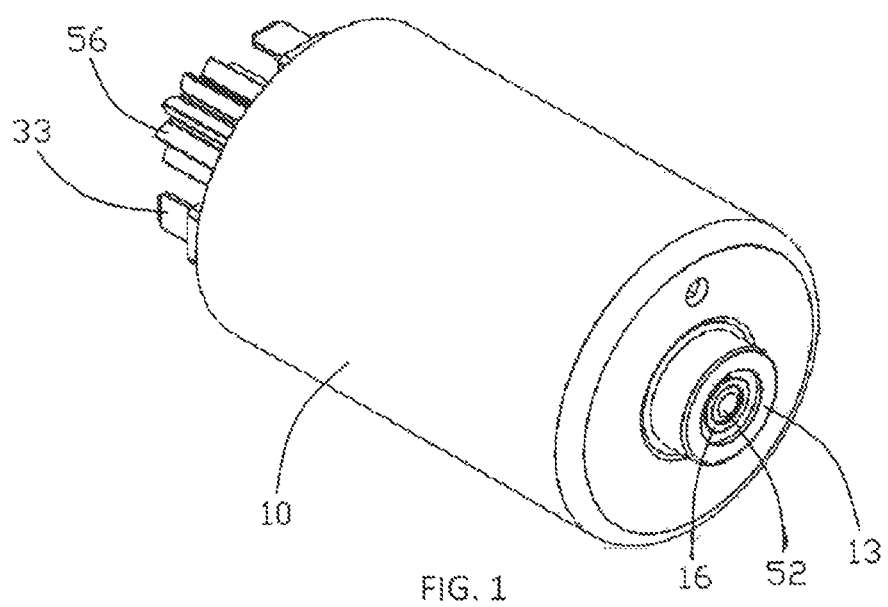
FIG. 1 illustrates an electric motor in accordance with the preferred embodiment of the present invention.
Figure 2:
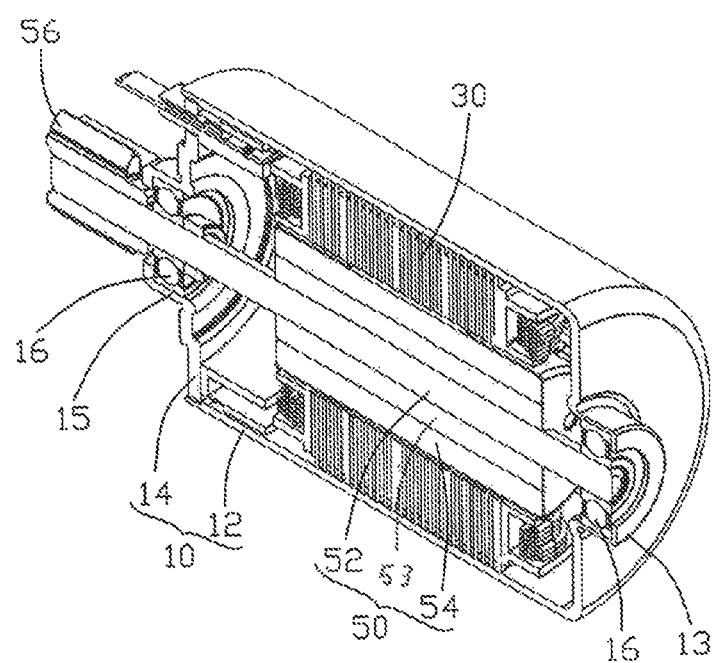
FIG. 2 is a sectional view of the motor of FIG. 1.

FIGS. 1 to 8 illustrate an electric motor incorporating a stator structure according to a first exemplary embodiment of the present invention. The illustrated motor is an inner rotor BLDC motor and comprises a stator structure 30 and a rotor 50. The stator structure includes a wound stator 31 fitted to a housing 10. The stator 31 includes a laminated stator core 35 and stator windings 37 wound about teeth of the stator core. The rotor is a permanent magnet rotor, having a shaft 52, a rotor core 53 fixed to the shaft (preferably as a press fit to avoid use of glue) and one or more permanent magnets 54 fitted to the rotor core. In this embodiment, there are four magnets and two rotor caps 55 covering the axial ends of the magnets and the rotor core is a laminated core produced by stacking a plurality of electrical steel laminations to provide a flux path for the magnet field produced by the magnets as well as a means to connected the magnets to the shaft 52. The rotor is rotatably mounted to the stator structure such that the stator core surrounds the rotor core. In this embodiment, the rotor is journalled in bearings 16 supported by the housing.

The stator core is fitted to the housing by a press fit as will be described below, to ensure that the stator does not rotate with respect to the housing.

The housing 10 comprises a housing body 12 and an end cap 14 that is connected to the housing body 12. The housing body 12 is cylindrical with an open end and a closed end. The end cover 14 closes the open end. The center of the end cap 14 axially and outwardly protrudes to form a bearing boss 15 to support one of the bearings 16. A similar bearing boss 13 is formed in the closed end of the housing body to support the other bearing 16. In this embodiment, the structures, shapes and sizes of the two bosses 13, 15 and the bearing holes are the same, but in other embodiments, they may be different. The two bearings 16 may be the same or different, and may be ball bearings, ceramic bearings, oil bearings, and the like. In this embodiment, the two bearings 16 both are ball bearings.

One end of the shaft 52 extends through the housing, in this example through the end cap 14, in order to engage with a load. A pinion 56 is shown fitted to the end of the shaft as an example of how to engage a load. It should be understood that as an alternative the magnets 54 may be directly fixed on the shaft 52.

Figure 3:
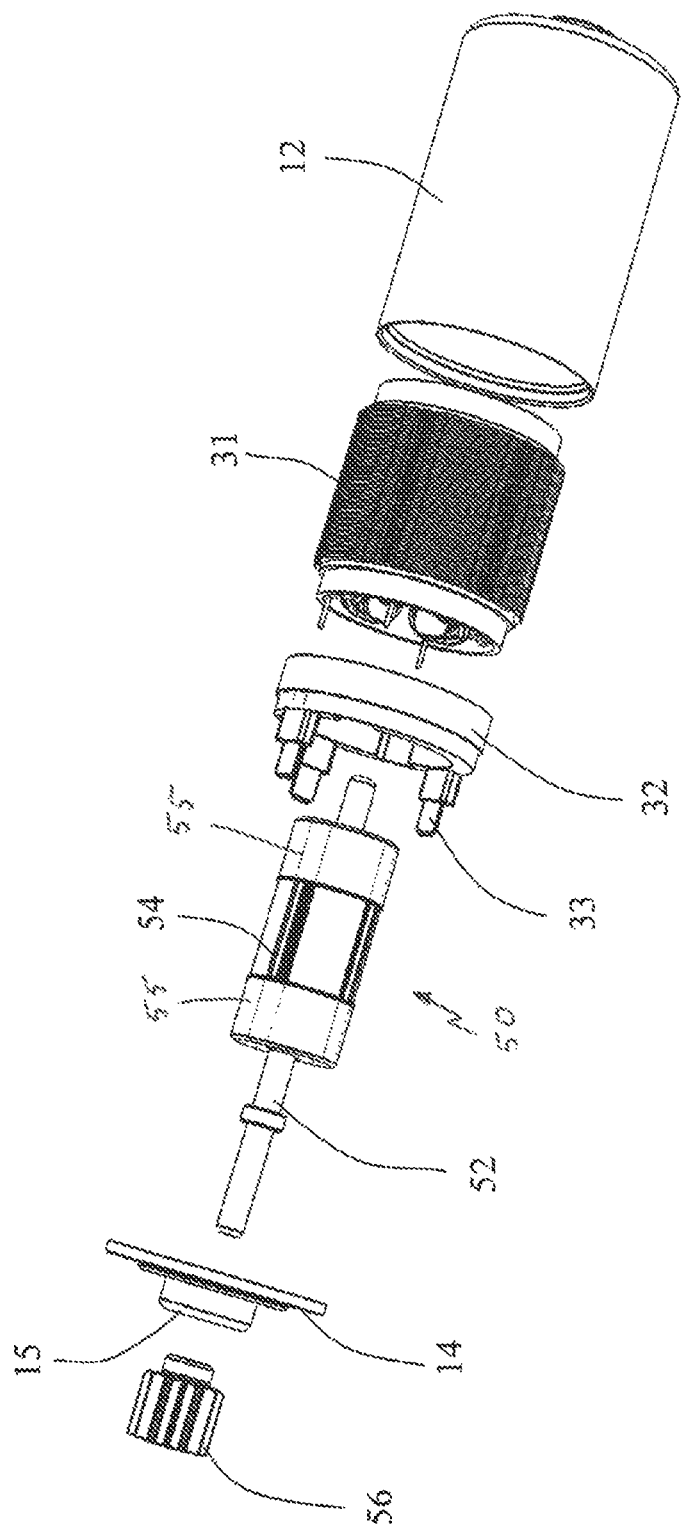
FIG. 3 is an exploded view of the motor of FIG. 1.

The stator core 35 is fixed in the housing body 12 at an axial location corresponding to the position of the magnets 54 of the rotor 50, so as to face the magnets across a predetermined air gap. As shown in FIG. 3, a terminal holder 32 is mounted to one end on the stator 31 and supports a number of terminals 33 which are electrically connected to the stator windings. The terminals pass through the end caps for connection to an external power supply. The stator core 35 is formed by stacking a plurality of laminations 34 made of a magnetically permeable material, such as electrical steel or silicon steel. The stator core 35 comprises a yoke part extending circumferentially and tooth parts extending inwardly from the yoke part. An insulation frame, also known as a core insulator 36 fits around the tooth parts of the stator core 35, and isolated the windings 37 from the stator core 35. As such, the windings are wound directly on the core insulator. 36 which also guides the ends of the windings for connection with the terminals.

Figure 4:
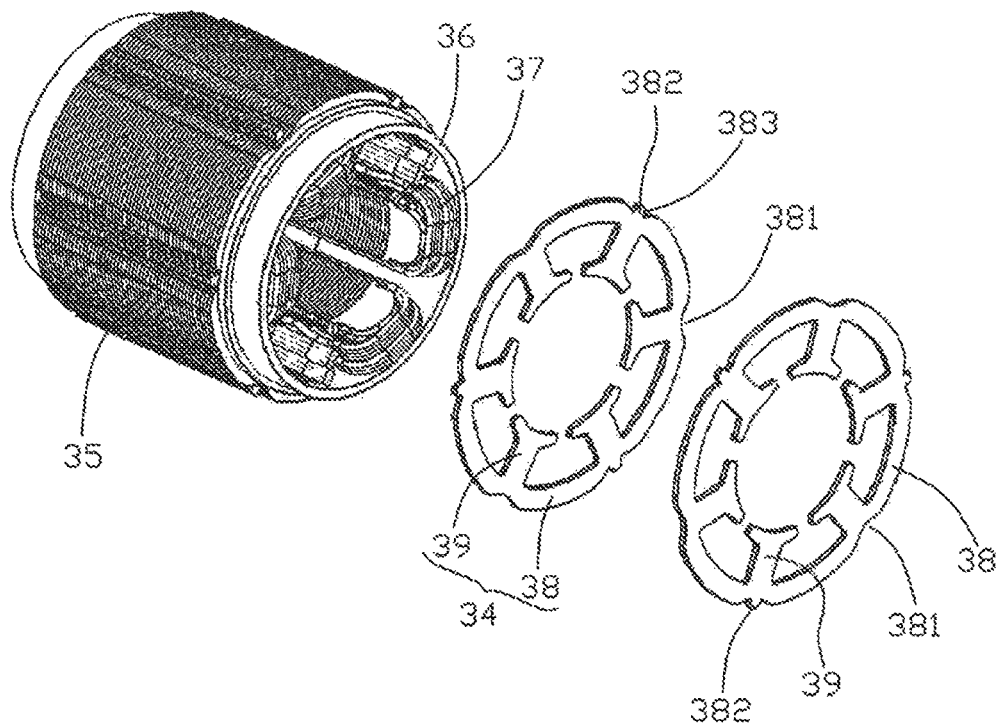
FIG. 4 is a partially exploded view of a stator of the motor of FIG. 1.
Figure 5:
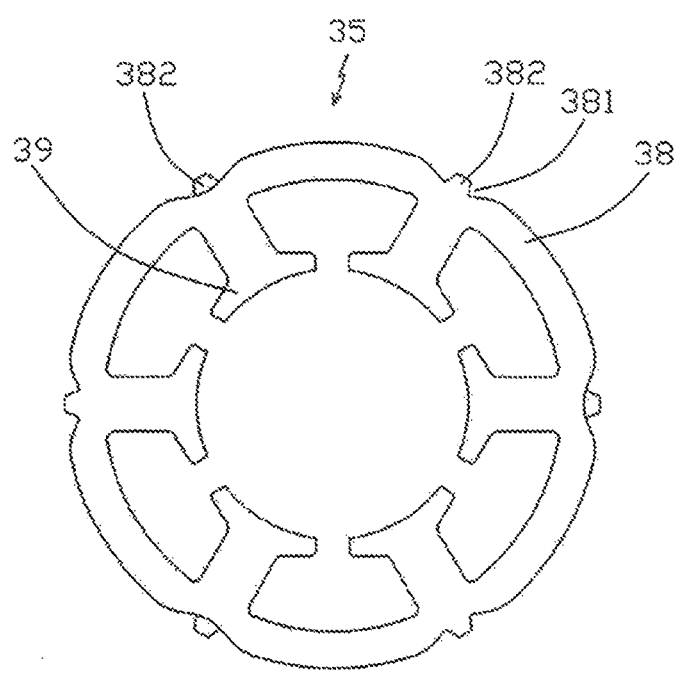
FIG. 5 is a front view of a stator core of the stator of FIG. 4.
Figure 6:
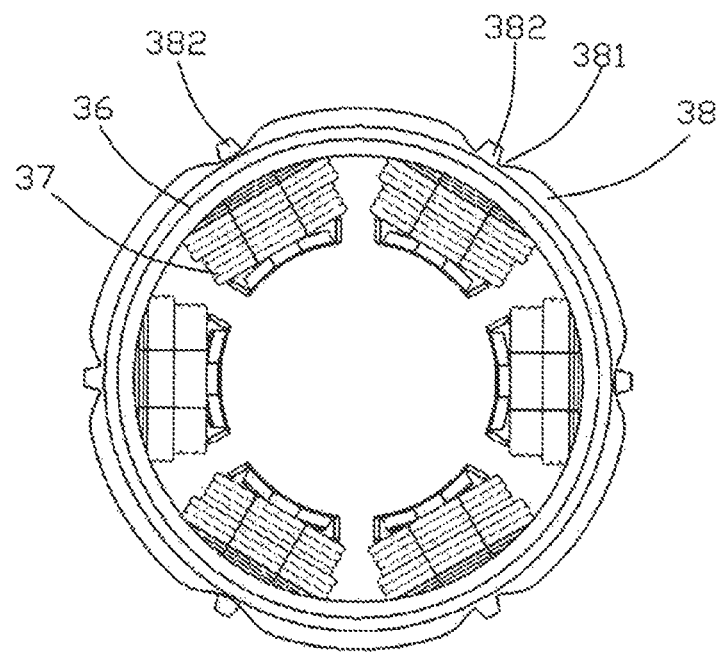
FIG. 6 is a front view of the stator of FIG. 4.
Figure 7:
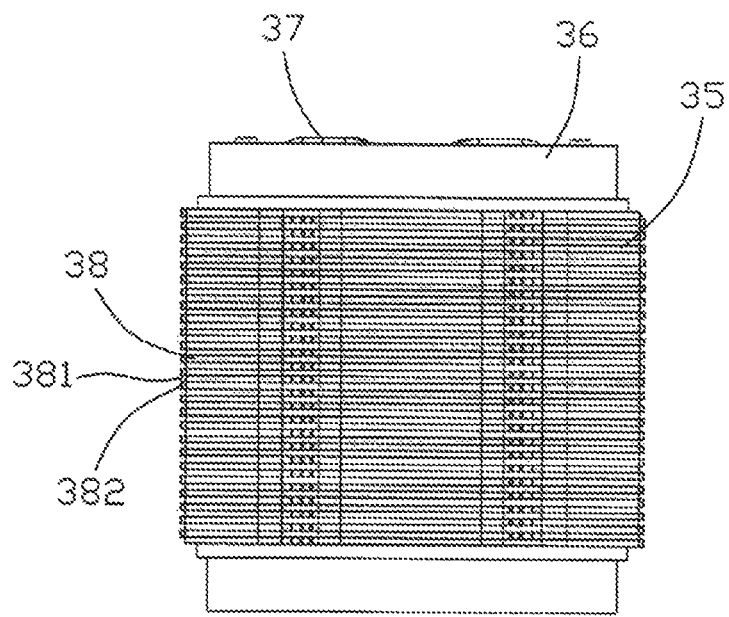
FIG. 7 is a side view of the stator of FIG. 4.

As shown in FIG. 4 and FIG. 5, the laminations 34 have the same structure. Each lamination 34 comprises an approximately annular body 38 and a plurality of teeth 39 that extend radially inwards from an inner edge of the body 38. The annular bodies 38 of the stacked laminations 34 form the yoke part of the stator core 35, and the teeth 39 of the laminations 34 form the tooth parts of the stator core 35. The core insulator frame 36 covers the tooth parts of the stator core 35 and the inner edge of the yoke part. The windings 37 are wound around the core insulator 36 which electrically isolates the windings from the stator core 35 so as to avoid short circuits. When energized, the windings 37 of the stator structure 30 generate the magnetic field which interacts with the magnets 54 of the rotor 50 to cause the rotor 50 to rotate. The rotor 50 drives the pinion 56, which in turn moves the load connected with the pinion 56.

The outer edge of the body 38 of each lamination 34 concaves inward to form recesses 381 or protrudes outward to form projections 382 at positions radially corresponding to the teeth 39. In this embodiment, the projections 382 and the recesses 381 are alternately disposed in a circumferential direction of each lamination 34, and radial outer ends of the projections 382 protrude slightly beyond the outer circumferential surface of the body 38 of each lamination 34. That is, the diameter of a circle, on which the outer end faces of the projections 382 are located, is slightly greater than the diameter of a circle, on which the outer edge of the body 38 of each lamination 34 is located. An incision 383 is formed in the body 38 at both circumferential sides of each projection 382, so that the two side faces of each projection 382 are separated from the body 38, which increases the radial length of each projection 382. As such, each projection 382 can be more easily deformed when subject to external interference such as being squeezed or pressed in an axial direction of the motor.

Referring to FIG. 5 to FIG. 8, when the laminations 34 are stacked in an axial direction of the motor, an adjacent next lamination 34 is rotated a preset angle relative to a former lamination 34, so that the projections 382 on one of the assembled two adjacent laminations 34 are aligned with the recesses 381 on the other of the assembled two lamination 34. The preset angle is decided by the number of the teeth 39 and is equal to an arc angle between two adjacent teeth 39.

In this embodiment, the number of the teeth 39 of each lamination 34 is 6, such that the arc between two adjacent teeth 39 correspondingly occupies one sixth of a circle, that is, the rotation angle of the adjacent lamination 34 during assembly is 60 degrees. In other embodiments, the rotation angle of the lamination 34 during assembly may vary with a change in the number of the teeth 39. For example, if the number of the teeth 39 is 8, the rotation angle should correspond to one eighth of a circle, namely 45 degrees. In addition, the projections 382 and the recesses 381 at the outer edge of each lamination 34 are alternately distributed. Therefore, after assembly of the laminations 34, two outer-side laminations 34 of three adjacent laminations 34 are completely overlapped, the recesses 381 and the projections 382 of the two outer-side laminations 34 are located at the same positions, the recesses 381 of a middle lamination 34 of the three adjacent laminations 34 are aligned with the projections 382 of the two outer-side laminations 34, and the projections 382 of the middle lamination 34 are aligned with the recesses 381 of the two outer-side laminations 34. That is, in an axial direction of the stator structure 30, the recesses 381 and the projections 382 are alternately distributed, the adjacent projections 382 are disposed at intervals, and the upper side and the lower side of each projection 382 in the axial direction are recesses 381, which provide spaces for the deformation of the projections 382.

After the laminations 34 of the stator structure 30 provided by the present invention are stacked to form the stator core 35, the slightly protruded projections 382 and concaved recesses 381 are disposed at the radially outer edge of the yoke part of the stator core 35. In the axial direction of the stator structure 30, the projections 382 and the recesses 381 are alternately arranged, two adjacent projections 382 are separated by one recess 381, and the projections 382 and the recesses 381 form a knurl-like structure on the outer circumferential surface of the stator core 35. Compared with the stator structure of the traditional inner rotor motor, the outer diameter of the annular body 38 of each lamination 34 of the present invention can be designed to be slightly smaller, which can make sure that the annular body 38 and the housing body 12 do not generate interference even in the presence of tolerance, while the size of each projection 382 can be designed to be slightly larger.

Figure 8:
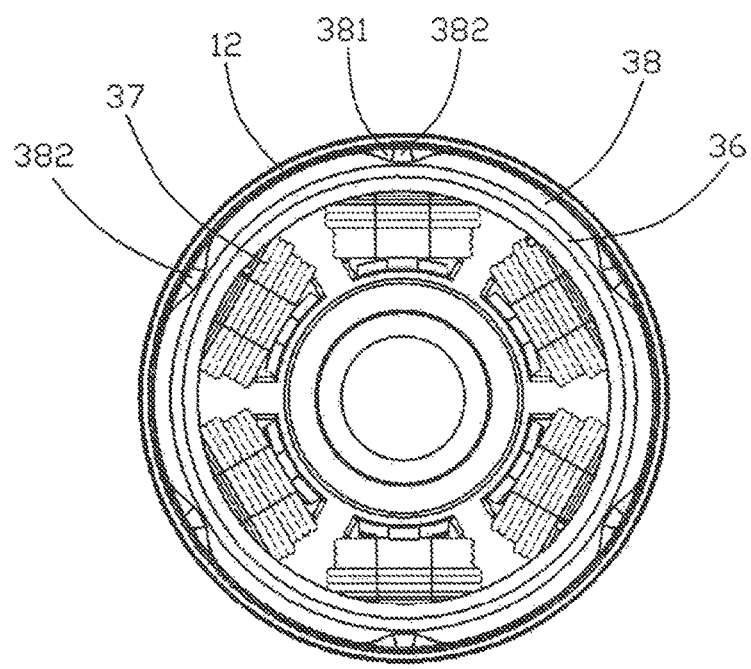
FIG. 8 is a front view of the stator inserted into a housing.

As shown in FIG. 8, when inserting the stator 31 into the housing body 12, even if the projections 382 and the housing body 12 interfere with each other due to the slightly larger size of the projections 382, the projections 382 can easily deform into the recesses 381 when pressed by the housing body 12, because each projection 382 is a protruding structure and the recesses 381 are arranged on both axial sides of a corresponding projection 382. Therefore, the stator 31 can be successfully inserted into the housing body 12.

In comparison with the traditional silicon steel sheet, whose outer circumferential surface of the body directly interferes with the housing body, after the stator 31 provided by the present invention is mounted in the housing body 12, the yoke part is in contact with the inner wall of the housing body 12 at the positions of the projections 382 and is separated from the housing body 12 at the positions of the recesses 381, so that the yoke part of the stator core 35 contacts the inner wall of the housing body 12 at discrete locations. The contact areas between the projections 382 and the housing body 12 are far smaller than the area of the outer circumferential surface of the body 38 of each lamination 34, and the recesses 381 at the two sides of the projections 382 provide spaces for deformation. Therefore, the projections 382 do not scratch the housing body 12 during mounting of the stator 31 into the housing body 12, that is, during assembly, the damage to the stator core 35 and the housing body 12 due to interference there between is avoided. After the stator 31 is mounted in the housing body 12, the projections 382 resiliently deform due to the interference with the housing body 12, which impose a corresponding reaction force to the housing body 12, so that the stator core 35 is a tight fit within the housing body 12. The high-temperature heating step as used in the prior art assembly method is not needed, and the use of glue is avoided. As such, the manufacturing process can be shortened, and the reliable assembly of the motor can be achieved.

Figure 9:
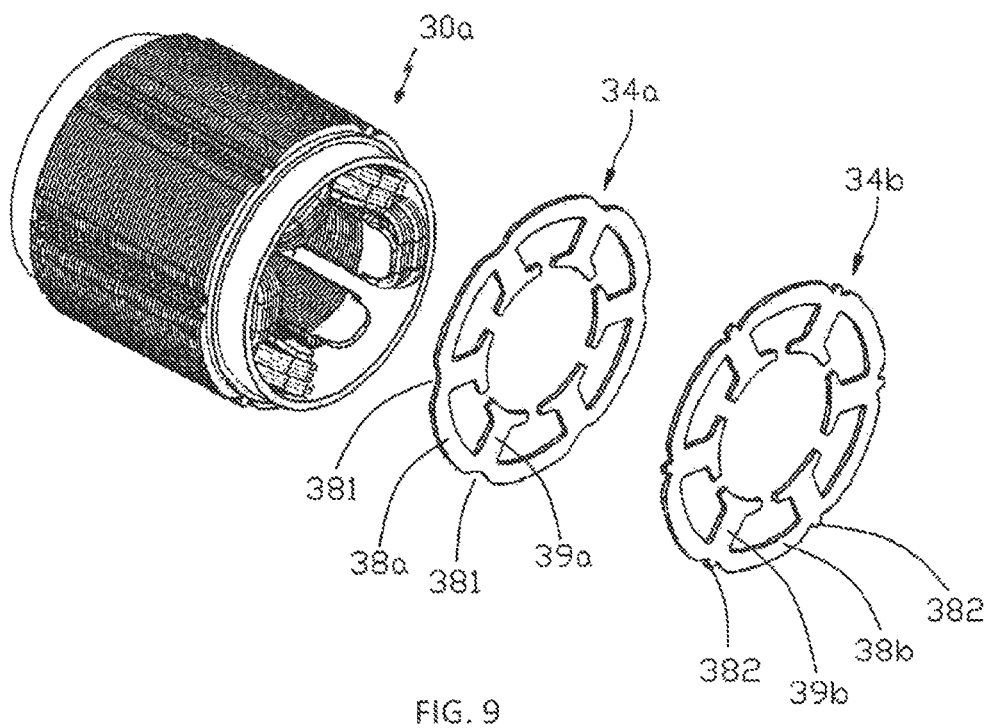
FIG. 9 is a partially exploded view of a stator according to another embodiment.
Figure 10:
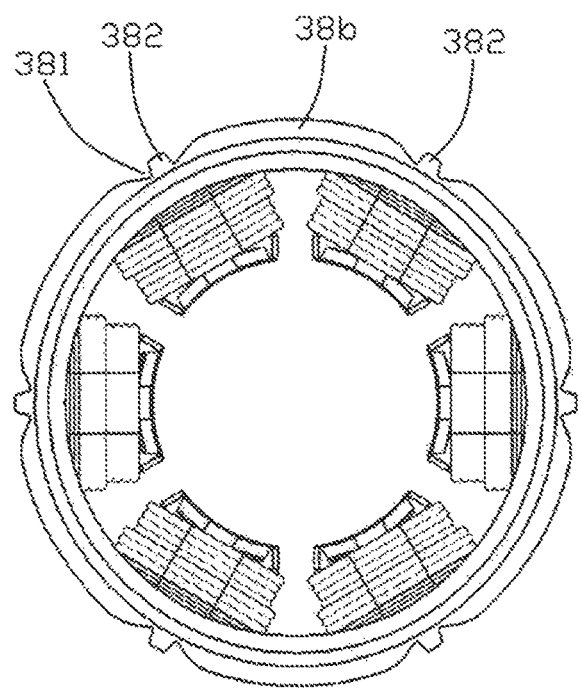
FIG. 10 is a front view of the stator of FIG. 9.
Figure 11:
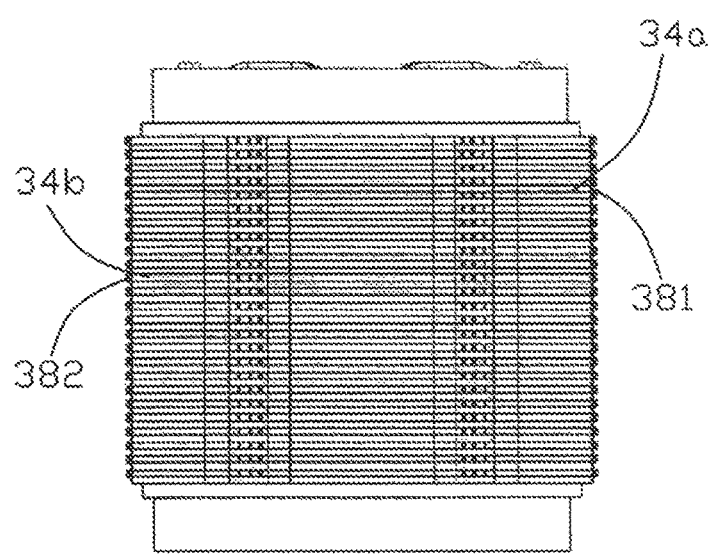
FIG. 11 is a side view of the stator of FIG. 9.

FIG. 9 illustrates another embodiment of a stator structure 30a. In this embodiment, a stator core of the stator structure 30a is formed by alternately stacking a plurality of first laminations 34a and a plurality of second laminations 34b, and the other components are constructed in the same way as in the first embodiment. The outer edge of an annular body 38a of each first lamination 34a has a recess 381 at positions corresponding to each tooth 39a, and the outer edge of a body 38b of each second lamination 34b has a projection 382 at a position corresponding to each tooth 39b. When the first laminations 34a and the second laminations 34b are alternately stacked, the teeth 39a and the teeth 39b are aligned with each other. After the first laminations 34a and the second laminations 34b are stacked in an axial direction, the recesses 381 of the first laminations 34a and the projections 382 of the second laminations 34b are alternately disposed, thereby forming knurls same as the knurls in the first embodiment, as shown in FIG. 10 and FIG. 11. When the assembled first laminations 34a and second laminations 34b are inserted into a housing body 12, the projections 382 of the first laminations 34a deform into the recesses 381 of the second laminations 34b so as to avoid scratching. In other embodiments, two or more first laminations 34a can be arranged between two adjacent second laminations 34b, that is, two or more recesses 381 can be disposed on each side of each projection 382, thereby forming the knurls and avoiding scratching of the housing body 12 due to deformation of the projections 382 of the second laminations 34b in the same manner. It can be understood that two or more second laminations 34b can also be disposed between two adjacent first laminations 34a.

Although the invention has been described using a BLDG motor as an example of a suitable electric motor, the invention is applicable to other motor types having a wound stator, for example, synchronous motors and switched reluctance motors.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. An electric motor comprising a rotor and a wound stator structure disposed about the rotor, the stator structure comprising:
   a housing having a cylindrical inner wall;
   a stator core mounted in the housing, and
   stator windings wound around the stator core,
   wherein the stator core comprises an annular yoke extending circumferentially and tooth parts extending inwardly from the yoke, the stator core is formed by stacking a plurality of laminations, and each lamination comprises an annular body that forms the yoke and a plurality of teeth that form the tooth parts, projections and recesses are formed on an outer edge of the annular body of the laminations to form a knurling on a radially outer surface of the yoke, the projections are in contact with the inner wall of the housing, and in an axial direction of the stator structure, the projections and the recesses are interposed, allowing the projections to be deformed axially, so that the yoke contacts the inner wall of the housing at discrete locations.

2. The motor of claim 1, wherein a plurality of said projections and recesses are formed at an outer edge of the body of each lamination.

3. The motor of claim 2, wherein the projections and recesses of each lamination are alternately distributed in a circumferential direction.

4. The motor of claim 2, wherein the projections of one of two adjacent laminations are aligned with the recesses of the other one of the two adjacent laminations.

5. The motor of claim 1, wherein the laminations comprise a plurality of first laminations and a plurality of second laminations, a plurality of said recesses are formed in an outer edge of the annular body of each first lamination, a plurality of said projections are formed at the outer edge of the annular body of each second lamination, the first laminations and the second laminations are interposed.

6. The motor of claim 5, wherein the laminations are alternately stacked, wherein at least one second lamination is disposed between two adjacent first laminations, the recesses of the first laminations being axially aligned with the projections of the second lamination.

7. The motor of claim 5, wherein one first lamination is disposed between each pair of adjacent second laminations and one second lamination is disposed between each pair of adjacent first laminations.

8. The motor of claim 5, wherein a plurality of the second laminations are disposed between at least one pair of adjacent first laminations.

9. The motor of claim 1, further comprising a core insulator is fitted to the stator core, wherein the windings are wound around the core insulator and the core insulator electrically isolates the windings from the stator core.

10. The motor of claim 1, further comprising a terminal holder, wherein terminals are supported by the terminal holder, one end of each terminal is connected with a corresponding one of the windings, and the other end of each terminal is configured for connection to an external power supply.

11. The motor of claim 1, wherein the projections and recesses correspond to positions of the teeth in a radial direction of the motor.

12. The motor of claim 1, wherein the rotor comprises a shaft and a permanent magnet fixed to the shaft.

13. The motor of claim 12, wherein the permanent magnet comprises a plurality of permanent magnets fixed to the shaft by a magnetically permeable rotor core.

* * * * *